United States Patent [19]
Isert et al.

[11] Patent Number: 5,288,151
[45] Date of Patent: Feb. 22, 1994

[54] LINEAR MOTION GUIDE UNIT

[76] Inventors: Hugo Isert, Im Leibolzgraben 16, W-6419 Eiterfeld; Hubert Scheich, An der Drift, W-6419 Eiterfeld-Arzell, both of Fed. Rep. of Germany

[21] Appl. No.: 956,856

[22] Filed: Oct. 2, 1992

[30] Foreign Application Priority Data

Oct. 2, 1991 [DE] Fed. Rep. of Germany ....... 9112285

[51] Int. Cl.⁵ ............................................. F16C 29/06
[52] U.S. Cl. ........................................ 384/49; 384/43
[58] Field of Search ................................. 384/43–45, 384/49, 50, 52, 55

[56] References Cited

U.S. PATENT DOCUMENTS

| | | | |
|---|---|---|---|
| 2,519,101 | 8/1950 | Bardet | 384/52 |
| 3,436,132 | 4/1969 | Wiesler | 384/43 |
| 3,907,385 | 9/1975 | Bartenstein | 384/44 |
| 4,775,247 | 10/1988 | Isert | 384/43 |
| 4,789,249 | 12/1988 | Mutolo | 384/43 |

FOREIGN PATENT DOCUMENTS 0207215  1/1987  European Pat. Off. .

*Primary Examiner*—Thomas R. Hannon
*Attorney, Agent, or Firm*—Fred Philpitt

[57] ABSTRACT

Two shafts (20) of a linear motion guide unit (10) are clamped together on a support (12) with positive line locking by bolts (24) engaging tapped pocket holes (22) inclined an acute angle ($\alpha$) relative to each other, one screw-hole (42) in the support (12) being inclined relative to a neighboring hole or to a mirror-symmetrical pair of counter-holes (44). Rail bodies (14) of aluminium integral with flat bars (30) include a fillet (26) with an adjacent crest (16) and a recessed step (28). Abutting shaft ends (47) may be clamped, by bolting at a counter-hole pair (44), to a through-shaft fixed at a central hole (42) on a single support (12 or 31). A continuous rail body having spaced groups of screw holes (40, 41) may be part of a box-like hollow section (64). In a three-cavity profile (70), two outer hollow sections (64) join a center cavity (71). A motor-driven carriage (49) includes strings of balls (54) or rollers (55) for engaging the outer surfaces (21) of the shafts (20) and supports a slide member (60) for zipping operation of self-sealing lips (61) situated at an open hollow section (64) side.

20 Claims, 13 Drawing Sheets

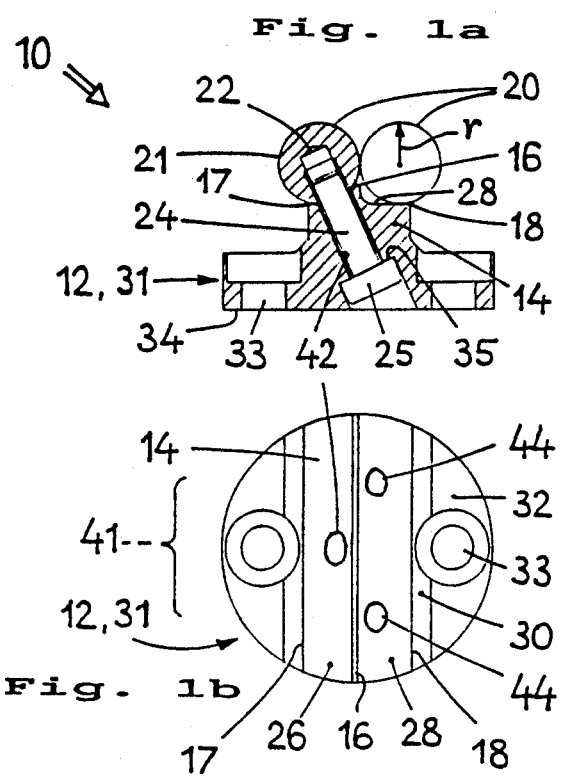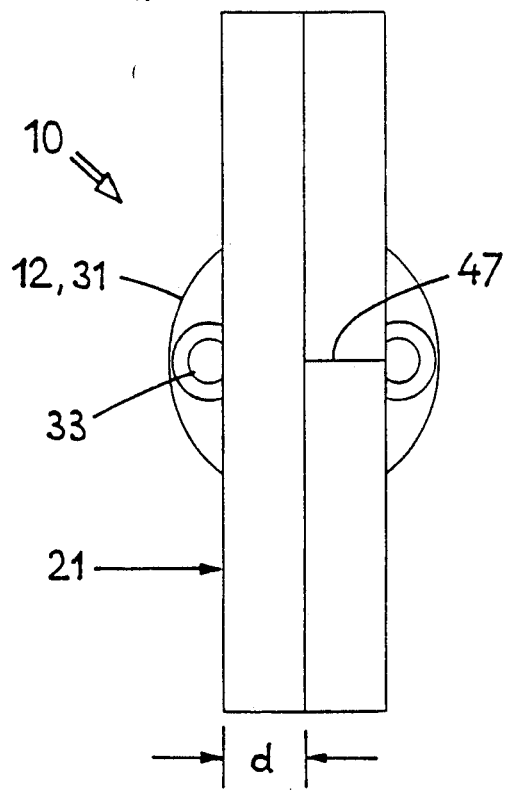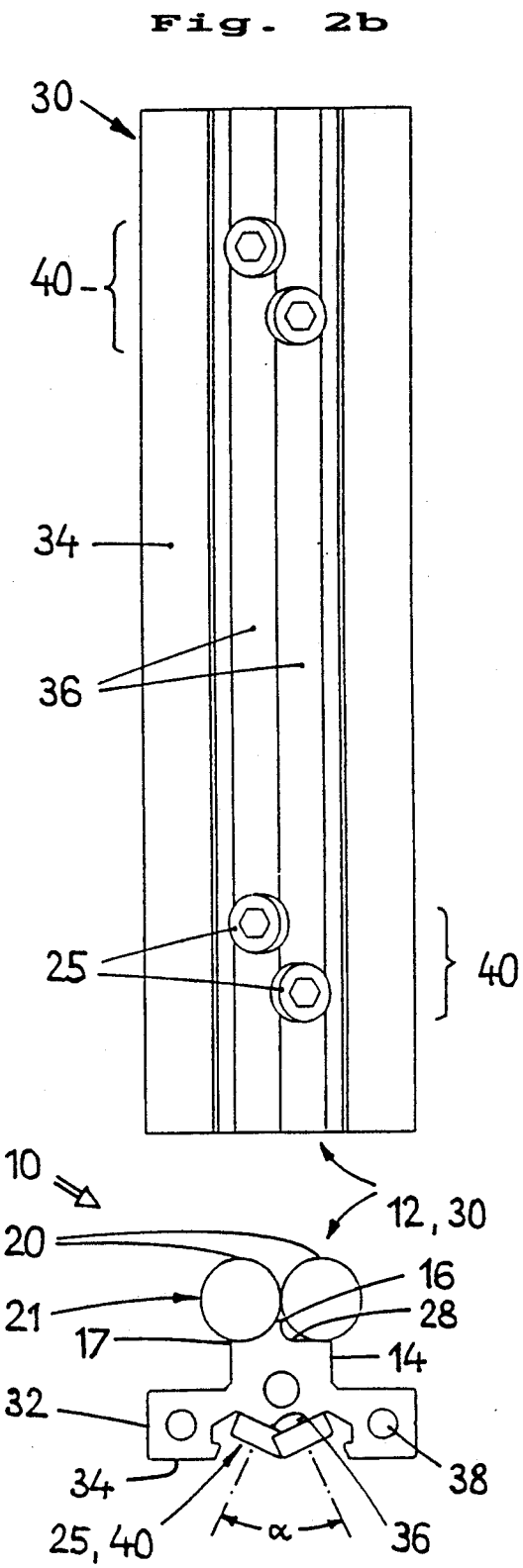

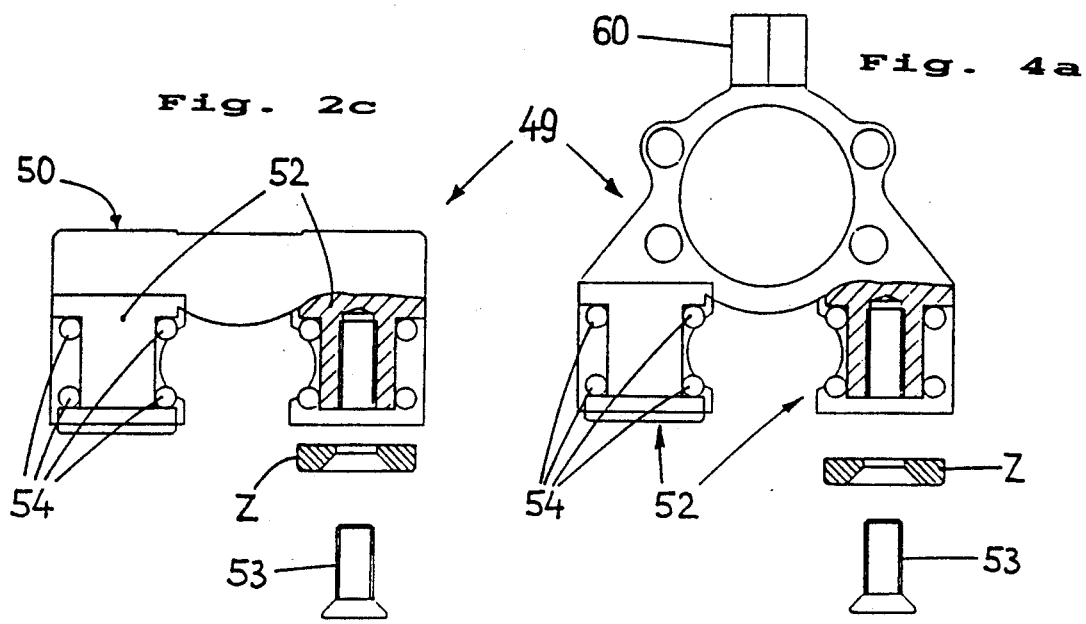
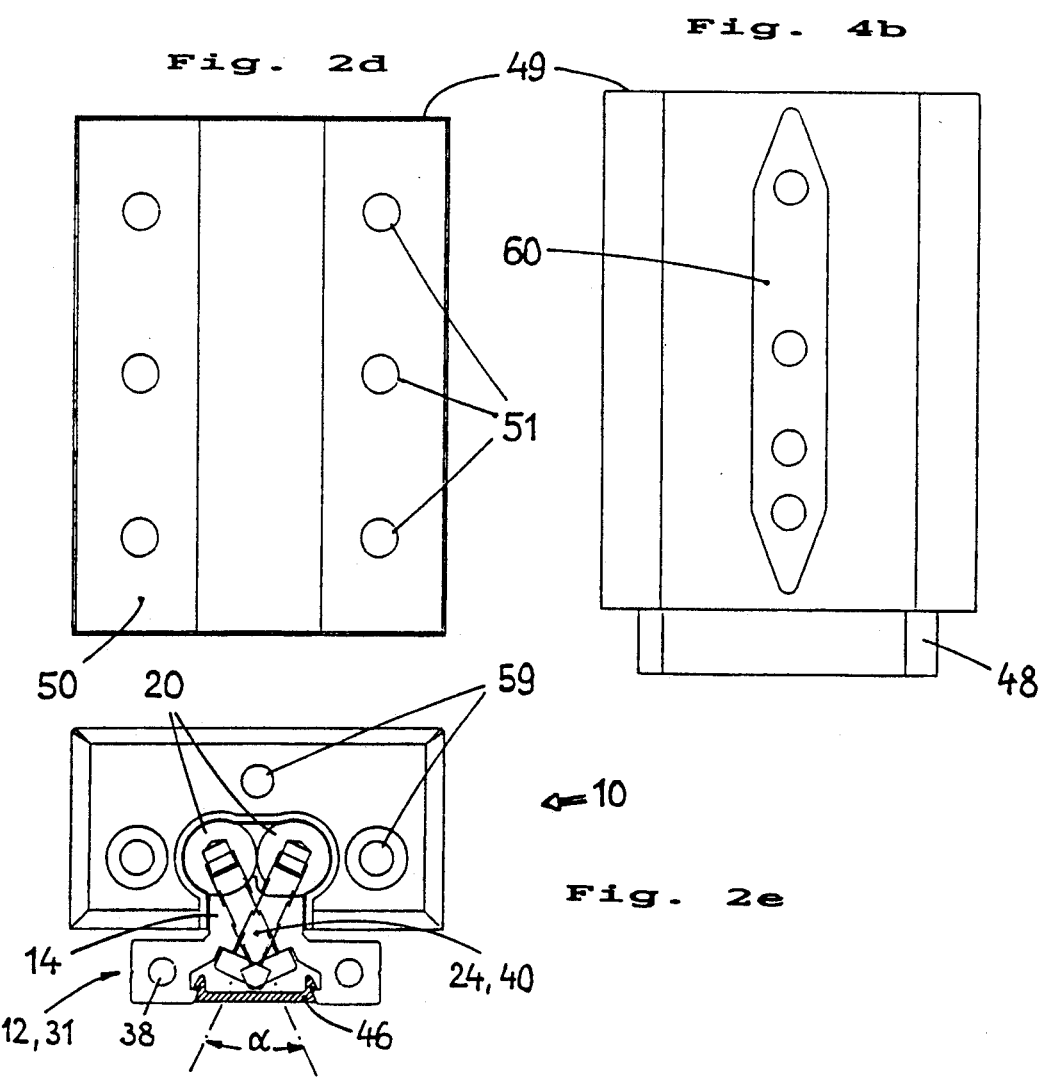

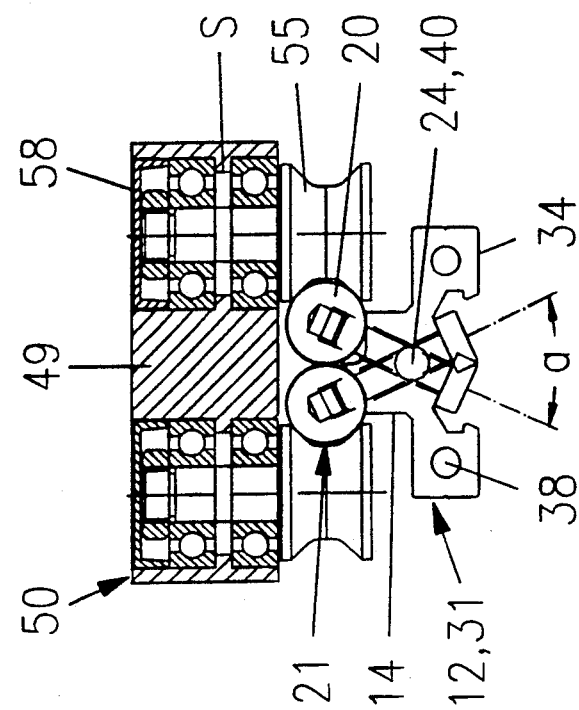
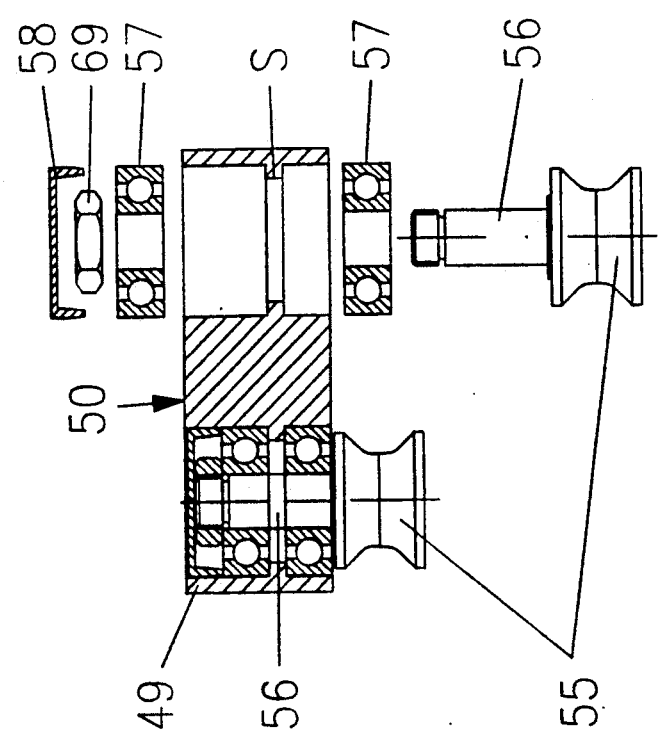
Fig. 3b
Fig. 3a

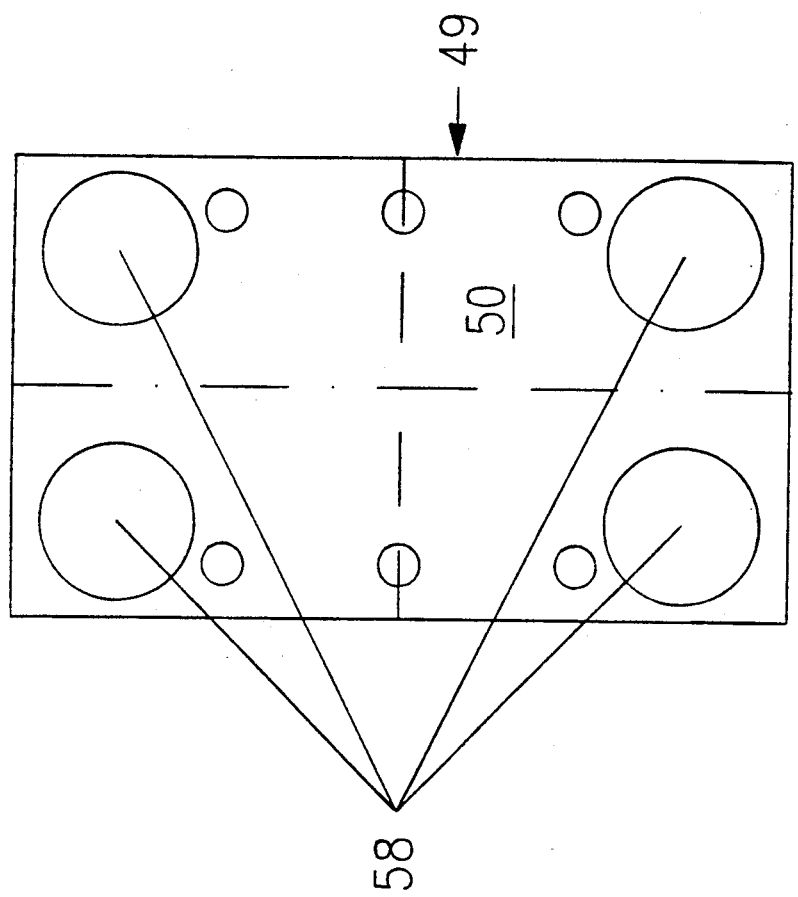

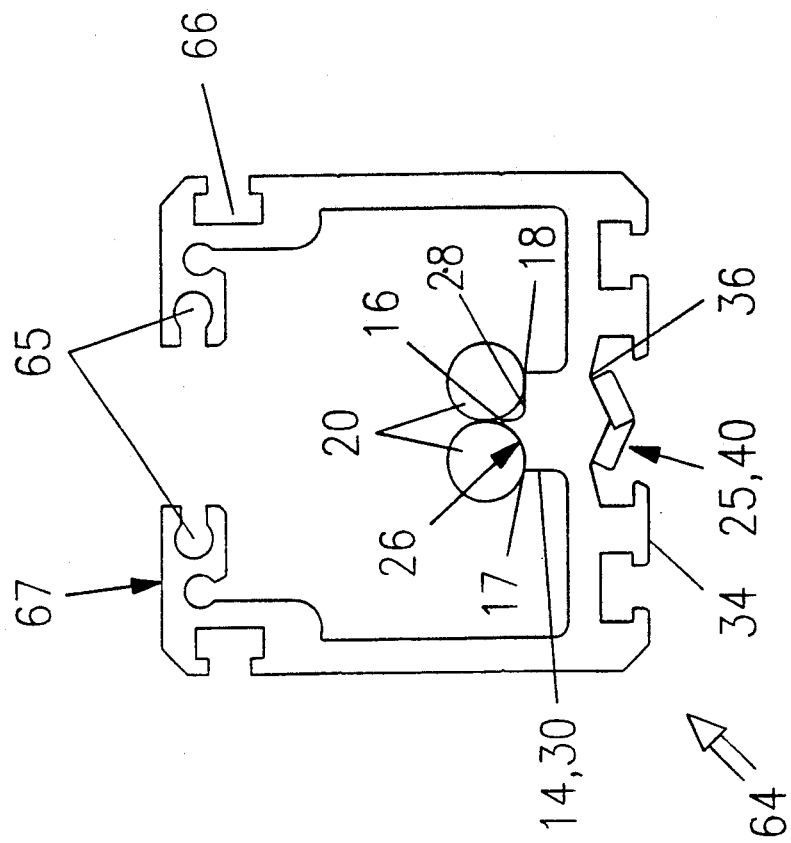
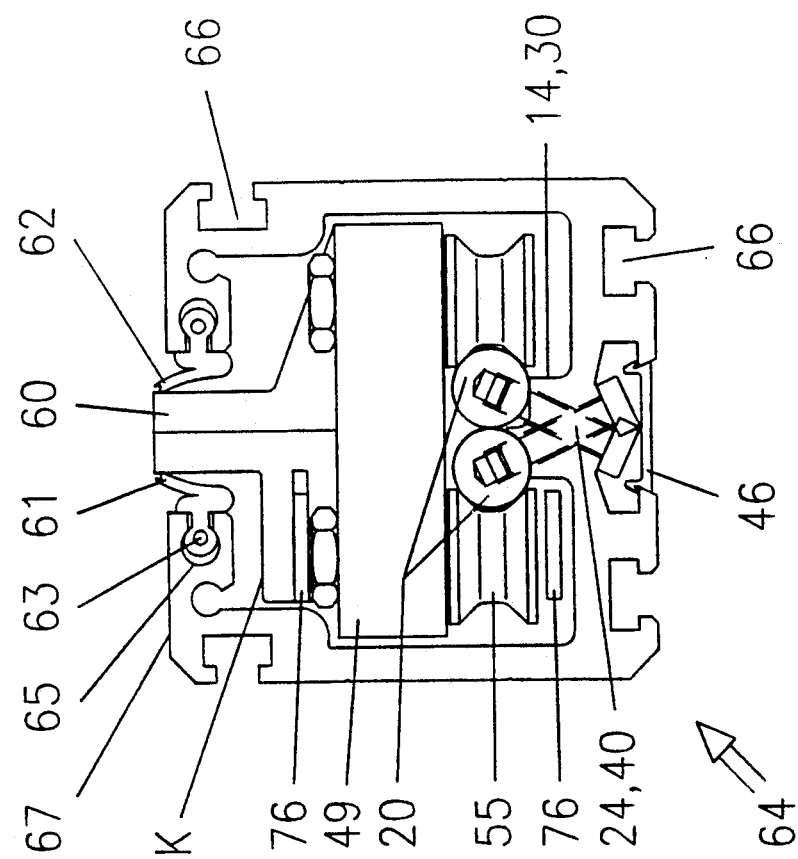

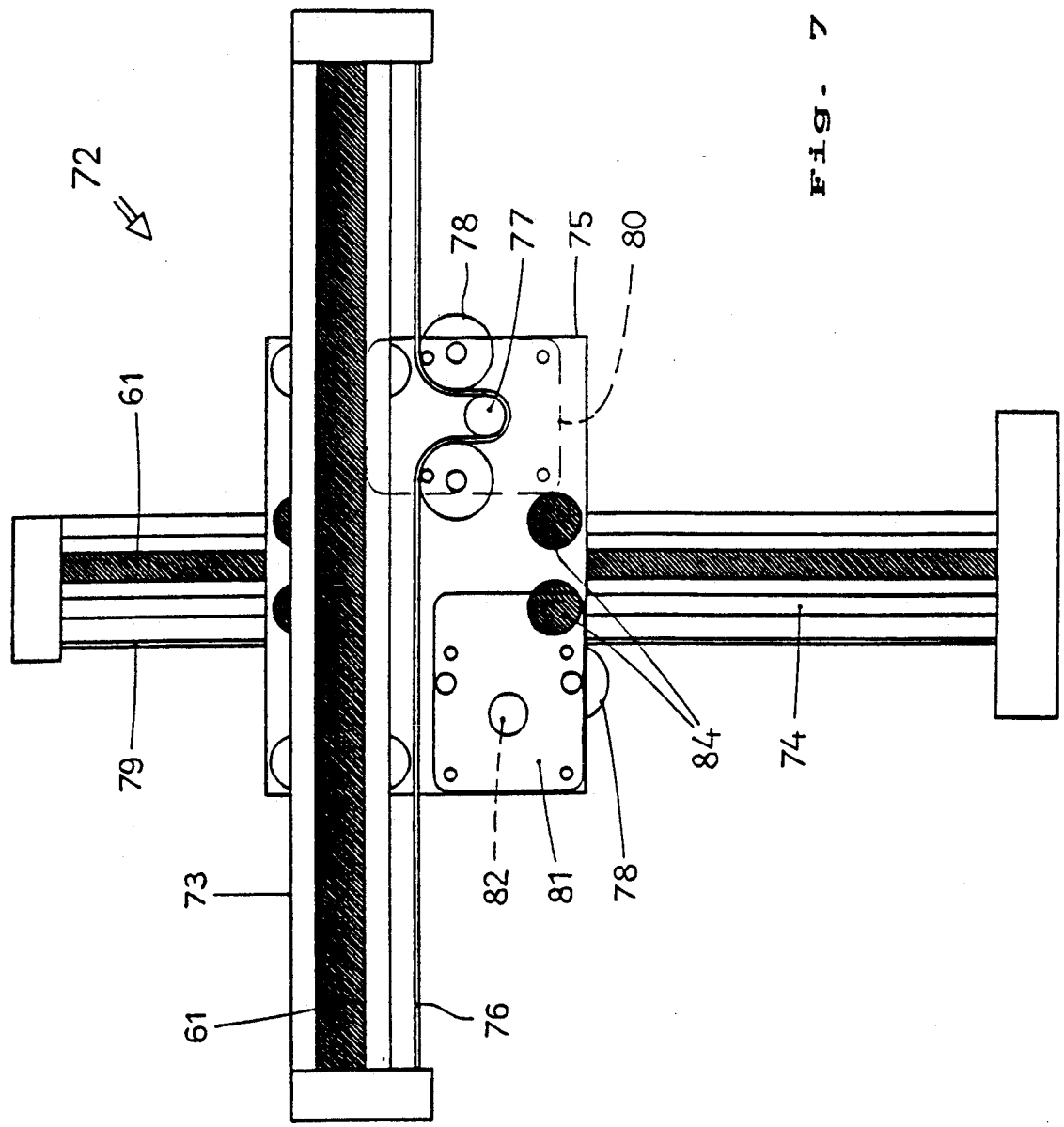

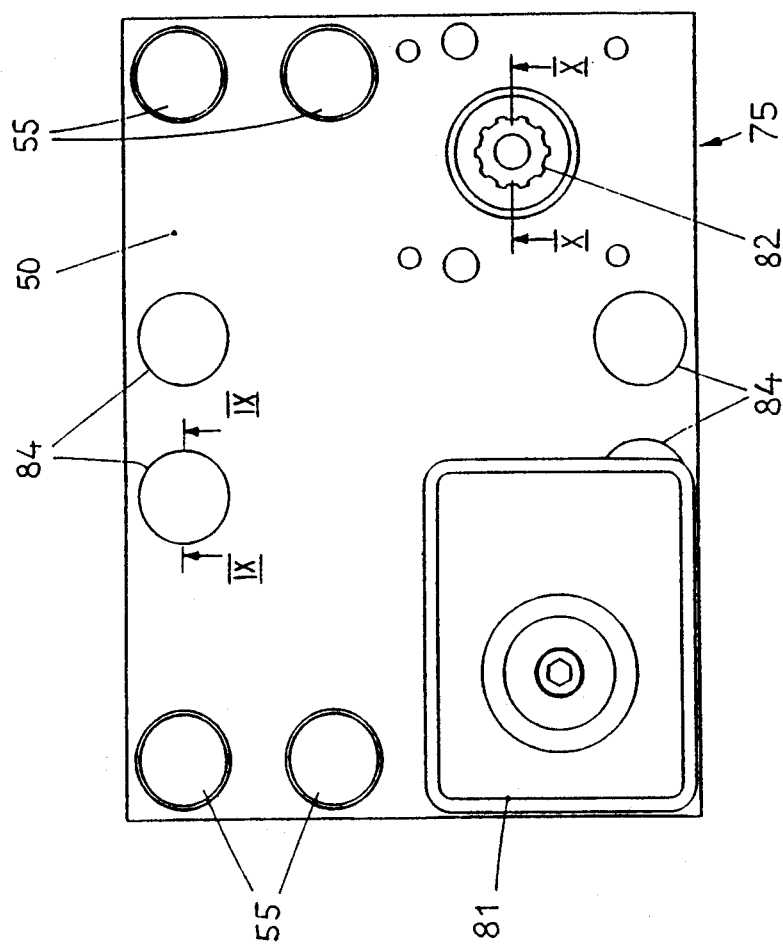
Fig. 8
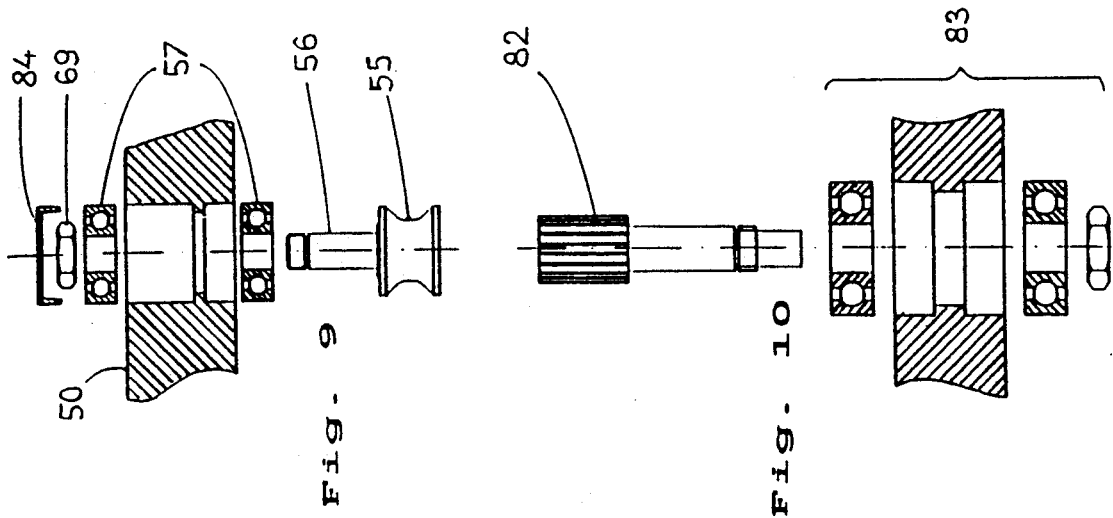
Fig. 9
Fig. 10

LINEAR MOTION GUIDE UNIT

The invention relates to a linear motion guide unit according to the generic portion of claim 1.

BACKGROUND

For variegated engineering applications, e.g. in the precision mechanics and electronic industries, guide means are required for exact translatory movements. A very simple device consists of a shaft which is seated on a support and which, in turn, rides an open ball bush that may comprise a top plate for supporting an apparatus. However, this type of guide is not in itself locked, or lockable, against rotation.

In FR-A-1 124 901, a rail was proposed whose head carries on either side pairs of shafts opposite to which a carriage has further shaft pairs of like sort; a plurality of balls between adjacent shaft pairs is provided for smooth run of the carriage. But the design expenditure is large since continuous series of balls must be held or restrained along the entire rail. Similar to CH-A-347 049, the two shafts are fixed partly in a broad rectangular groove merely by the heads of a few bolts located in side flanges so that, especially under load, parallelism is not warranted at all.

Other guide systems such as disclosed in DE-A-3 040 711 and EP-B-0 080 515 make use of two shafts supported on single blocks or by clamping profiles that restrain the shafts throughout their length, tight fit being an absolute necessity for accurately guiding a carriage whose rollers or linear ball bearings ride on the shafts. Their outer shaft peripheries may be grasped and possibly forced inwards by a pressure plate. It is critical, though, to what extent the fixing screws or bolts are tightened, as a deformation of the shafts may easily occur.

In accordance with EP-B-0 245 656, adapter pieces are used for fixing shafts in a rail body designed as an integral clamping profile. While the attachment components do not influence the force which clamps the shafts in their position, there is no bolting of them so that exact parallelism is not safeguarded. The same applies to a so-called roller guide unit comprising shafts rolled down into grooves of a support.

OBJECTS OF THE INVENTION

It is an important objective of the invention to overcome the drawbacks of the prior art by an improved linear motion guide unit that warrants, with a minimum of expenditures, a maximum of accuracy and stability.

The invention further aims at providing a linear motion guide unit of sturdy design, simple structure and low weight, with the possibility to economically take different requirements as to speed and load into account right at the outset.

Another object of the invention consists in creating a linear motion guide unit of such design that its manufacture and assembly can be carried out quickly and reliably.

PRINCIPLES OF THE INVENTION

Main features of the invention are stated in claim 1. Further embodiments form the subject matter of claims 2 to 20.

In a linear motion guide unit having a support for pairs of parallel clamped shafts along which at least one member to be guided or a carriage is supported thereon via linear ball bearings, rollers or the like which reach over the pair of shafts for rolling or sliding engagement on their outer surfaces, respectively, the invention provides that the shafts are clamped together, with positive line locking, by bolting onto the support through which bolts extend that are at an angle relative to each other. The strong structure of this novel guide unit warrants that it is and remains perfectly straight, no matter how long it is. Precision steel shafts may be used. Their accurately parallel and tight arrangement provides maximum safety against rotation or twisting.

SPECIALIZATIONS

An important feature is stated in claim 2 according to which each support includes a rail body having a central crest and, parallel thereto, two outer edges at transversal distances to the crest that are smaller than the shaft diameter. Thus the support comprises three parallel engaging edges; it can conveniently be made to extremely high accuracy with guide tolerances in the range of 10 $\mu$m down to 1 $\mu$m, an improvement of no less than a whole magnitude over the prior art.

This is advantageously enhanced if, according to claim 3, each support comprises a round fillet which matches the shaft radius and which is joined by a recessed step along the longitudinal center of the support. It is, therefore, possible to first bolt one shaft to the round fillet portion of the support and then pull the second shaft onto the adjacent step by oppositely inclined bolts whereby the shafts are pressed towards each other and form an extremely stiff pair.

Claim 4 provides for another important feature whereby at least some supports include groups of closely neighboring screw holes which are slanted, extend through the respective support and are in mirror symmetry to the crest. This design permits attaching the shafts in a both economical and exact manner so that manufacture and mounting are equally facilitated and accelerated. Each group may, according to claim 5, comprise a pair of mutually inclined screw holes so that a maximum of shaft parallelism is obtained with a minimum of design expenditure. Another modification according to claim 6 relates to triplet groups having a central hole, as seen in a longitudinal direction, which is inclined oppositely to a pair of counter-holes lodged along the crest in mirror symmetry to the central hole. This provides for a three-point bearing with mutually opposed transversal components bolting forces and thus for a most stable arrangement. Here, too, very high accuracy is achieved but production and assembly are nonetheless inherently free of problems Preferably, in accordance with claim 7, each screw-hole has at its bottom side a shoulder to be engaged by an associated bolt head, contributing to fast and secure fixing. According to claim 8, the bolts are arranged at an acute angle to each other and engage pocket holes of the shafts which holes can be bored and tapped very accurately Independent protection is sought for the design of claim 9 according to which each support is a mounting base to be individually bolted and is, in particular, a diecast aluminium profile having a base plate with an integral rail body. Thus it is rather simple to obtain modular units of linear motion guides, if desired of great lengths due to the modification of claim 10 whereby for extension of a shaft pair, two abutting shaft ends are clamped against a through-shaft bolted to the central hole and are bolted to the mounting base at a pair of counter-holes.

As an independent alternative, claim 11 provides that each support is an extended rail body integral with a rail bar, especially with a flat bar having a plane bottom face and pairs of screw holes at regular distances. The design warrants uniform overall line engagement of the shaft pair, permitting high accuracy and load capability.

By claim 12, the rail bar is a component of a preferably box-shaped hollow section whose bottom face may—in accordance with claim 13—comprise mutually inclined flutes which serve as stops for bolt heads. Hollow sections of this type are very stable structures that also offer mechanical protection for the member to be guided or for a carriage which usually bears a support plate. It is generally expedient if, according to claim 14, the hollow section has one open side and is provided with longitudinal recesses for receiving sealing lips. The movable portions can thus be conveniently introduced and shifted along the open side, whereas the remaining section parts are closed to exclude influences from outside.

Claim 15 provides for a multi-cavity profile having hollow section components, e.g. for a three-cavity profile with a closed center cavity and adjacent outer sections that contain an inner rail body each. Profiles of this type can be tailor-made to desired lengths. Due to their mechanical stability, they are well suited to receive in their interior at least two drive systems that may be either independent or coupled.

In the embodiment of claim 16, each carriage comprises a casing with an engaging portion, especially with a peripheral rib against which rolling bearings can be restrained for rigidly supporting a roller shaft. This is most advantageous in that series-produced rolling bearings can be force-fitted free of play whereby smooth-running precision rollers may be employed for fast motion applications. Moreover, according to claim 17, each carriage may comprise a slide member for zipping operation of self-sealing lips which are normally closed and are opened merely at the actual location of the carriage. The slide member may be secured to or integral with the support plate if such is provided on the carriage.

Important advantages of the invention are based on the design of claim 18 wherein two independent drive systems are provided for the carriage, in particular at a cross bed frame including a horizontal guide bar and a vertical guide bar. By claim 19, the drive systems selectively comprise spindle drives or synchronous belt drives or combinations thereof, all of which can be made and installed to great accuracy.

In a hollow section unit as per claim 20, the center cavity is adapted to receive supply lines, cables, driving elements, etc. Expediently, the center cavity walls may serve for fixing or encapsulating such components.

Further features, details and advantages of the invention will be apparent from the wording of the claims and from the following Description of preferred embodiments shown in annexed drawings wherein:

FIG. 1a is a sectional view of a linear motion guide unit,

FIG. 1b is a top view of a support,

FIG. 1c is a top view of the unit shown in FIG. 1a,

FIG. 2a is a face view of another linear motion guide unit,

FIG. 2b is a bottom view of the unit shown in FIG. 2a,

Figure 4D:
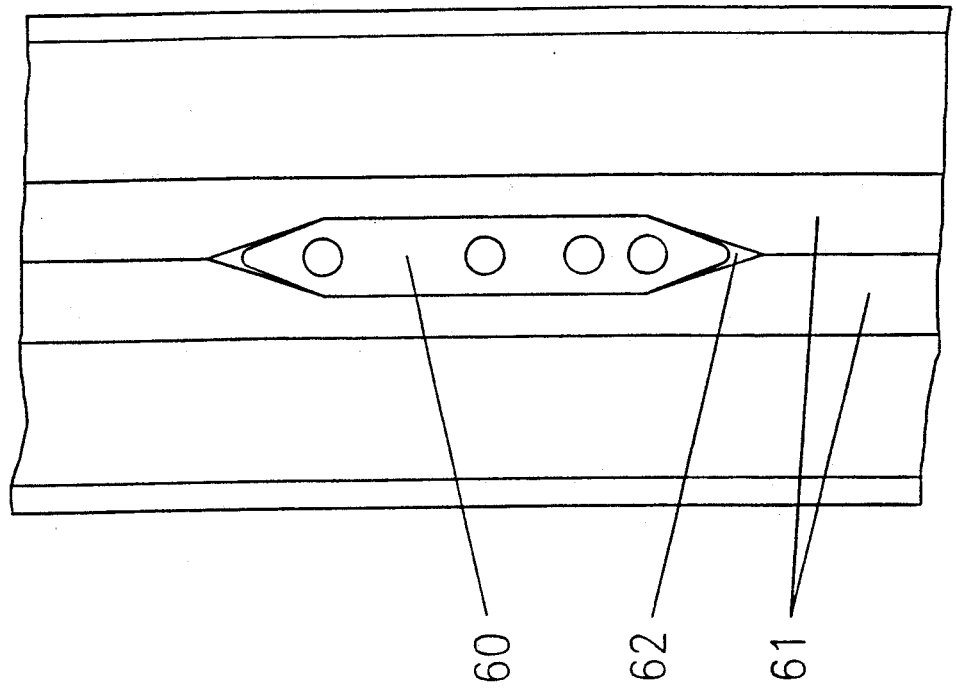
Figure 4C:
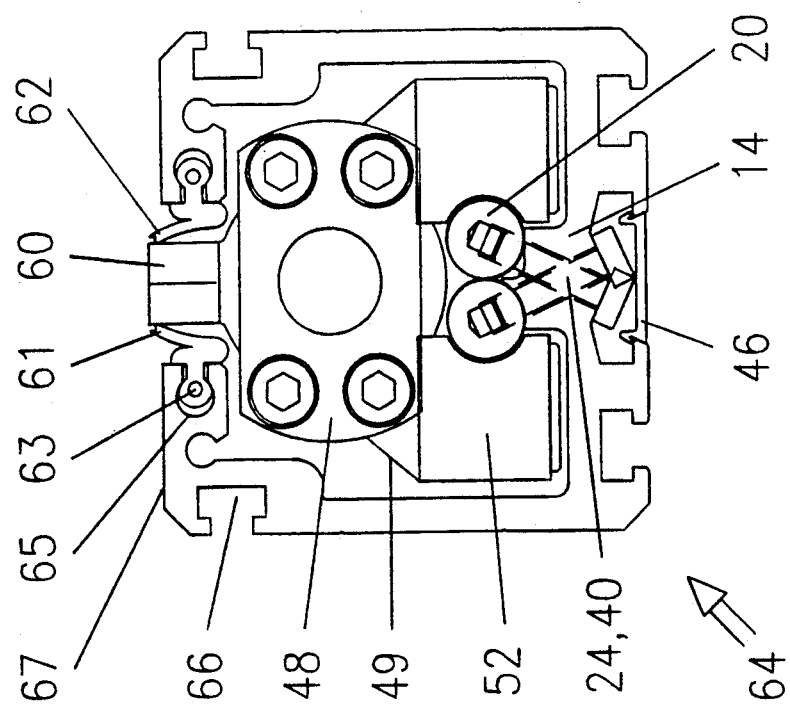
Figure 5B:
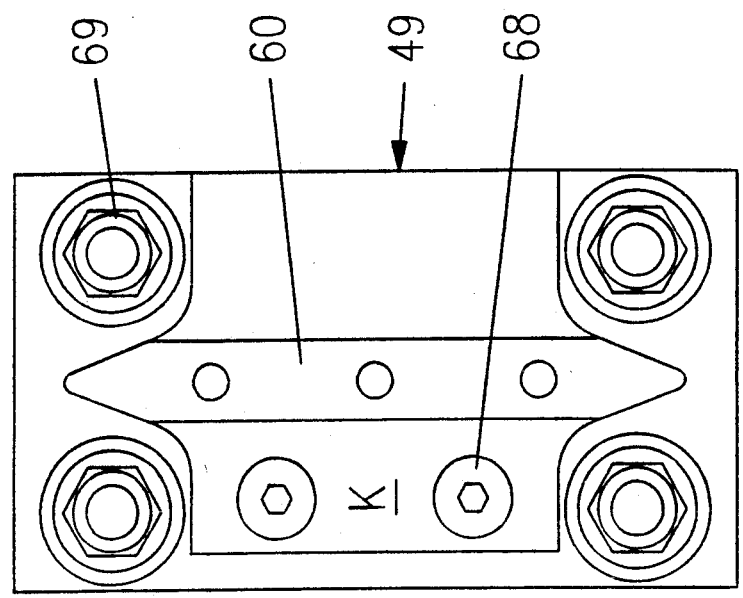
Figure 5A:
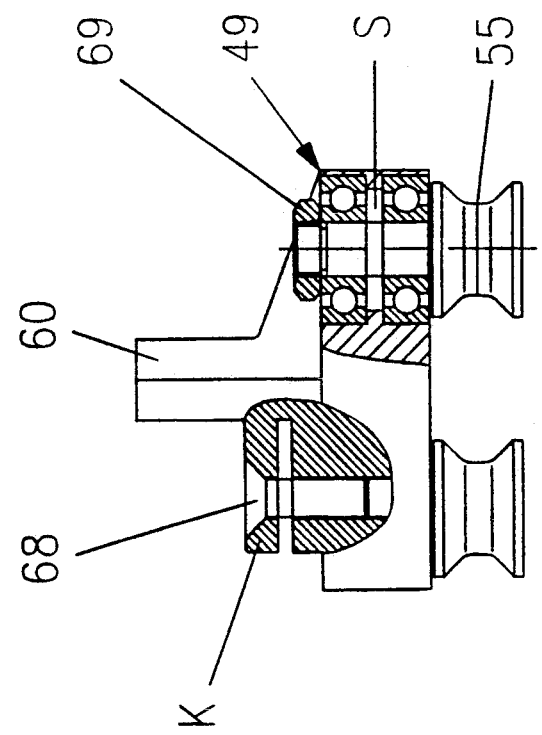
Figure 6A:
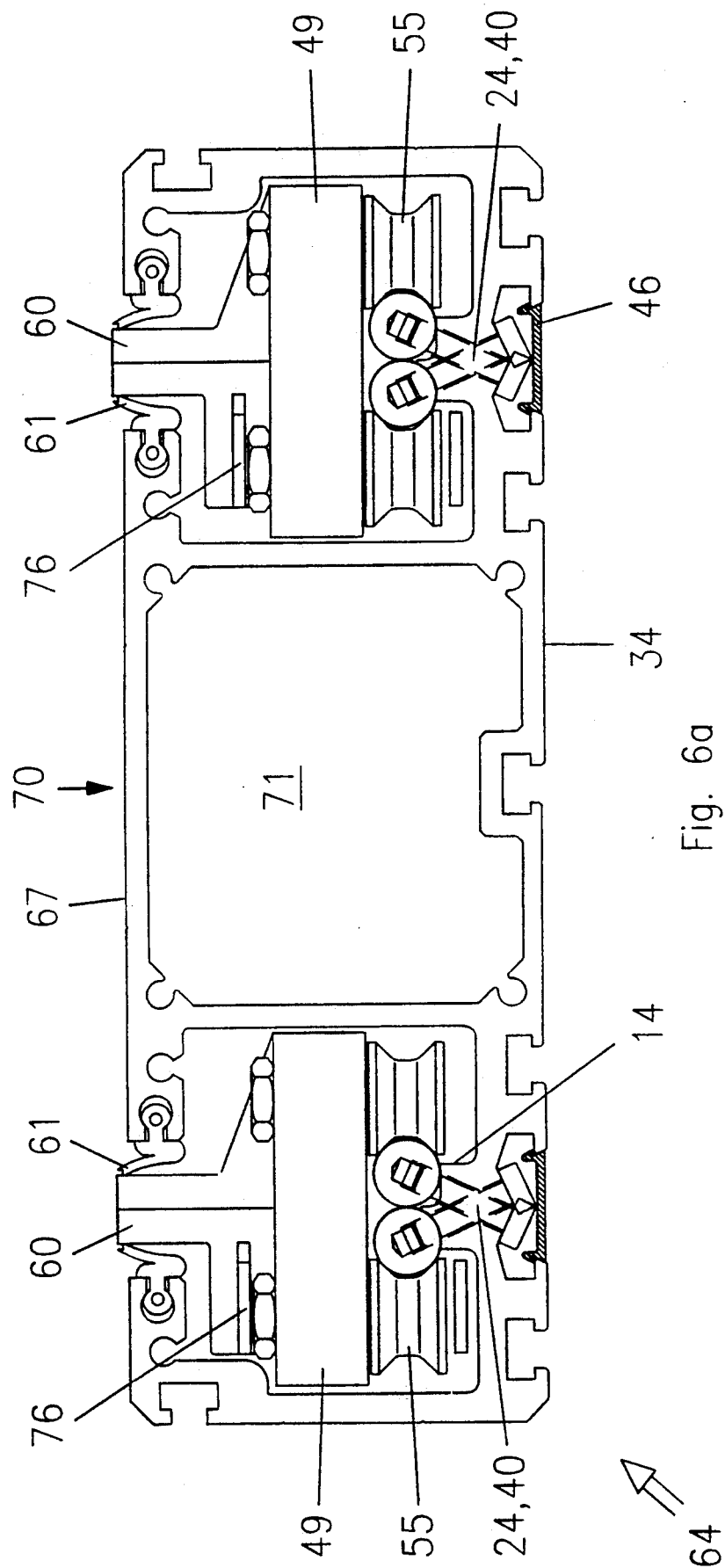
Figure 6B:
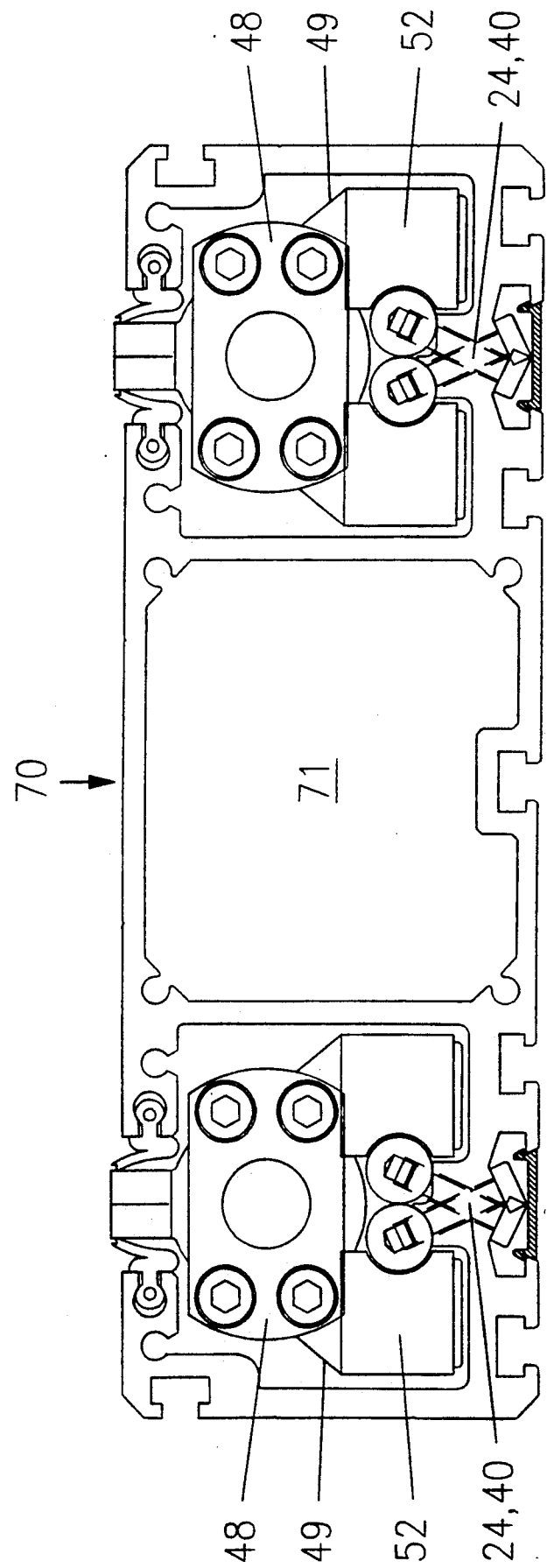
Figure 6C:
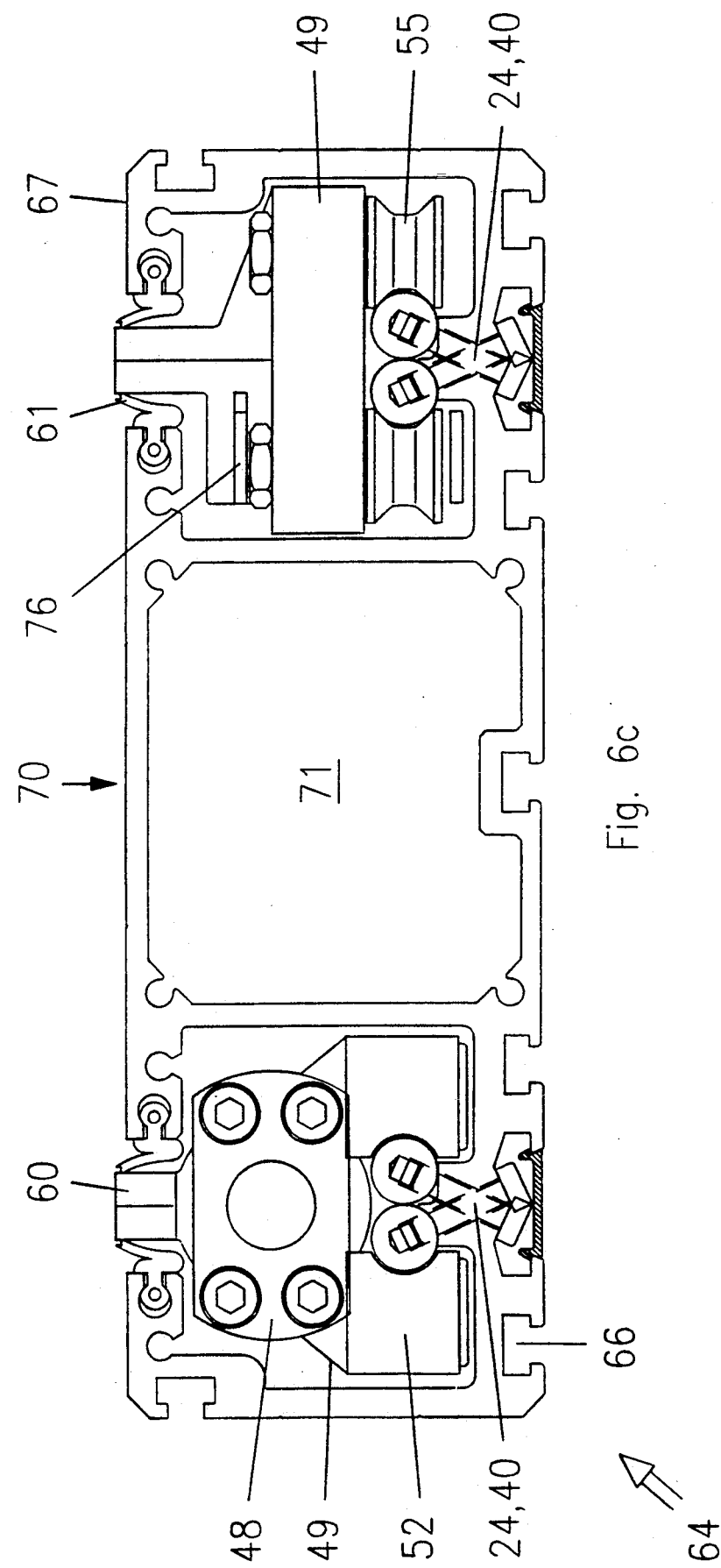
Figure 6D:
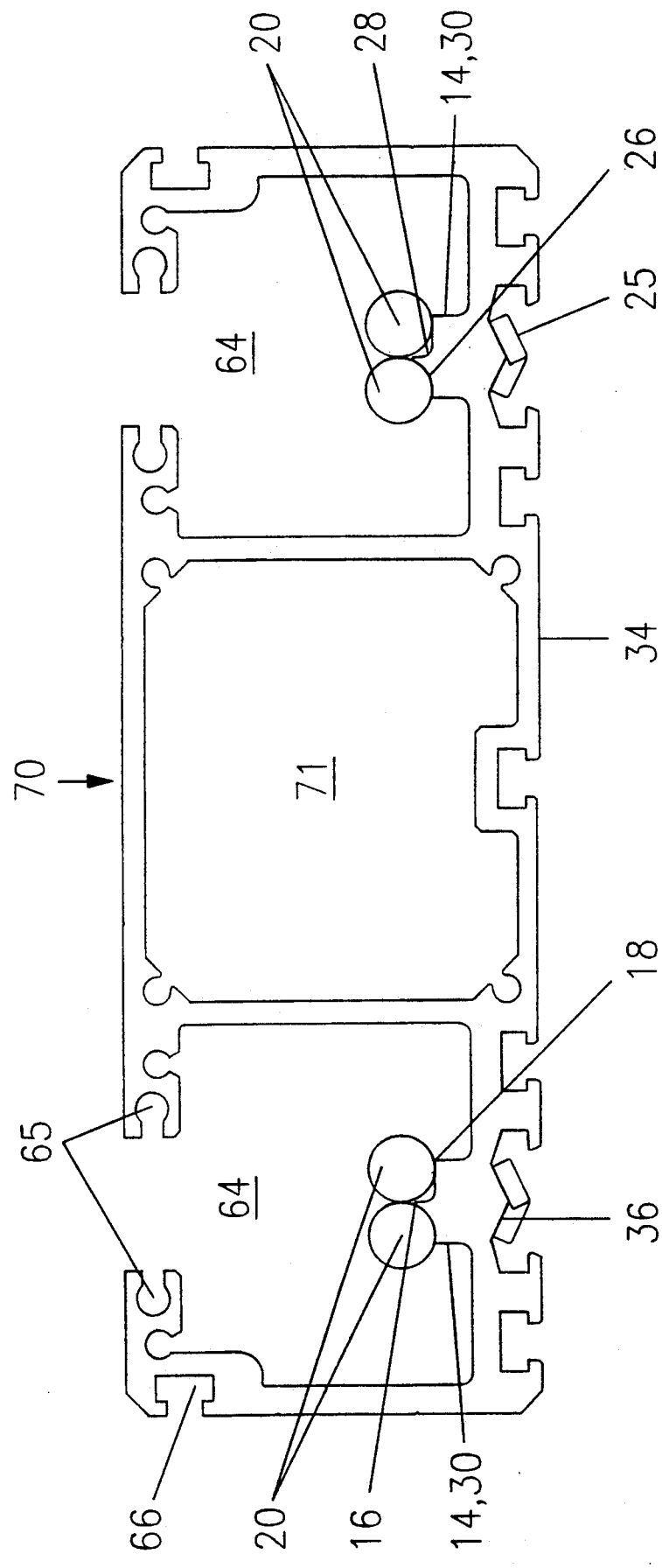

FIG. 2c is a face view, partly exploded and sectional, of a carriage for the unit shown in FIGS. 2a and 2b, FIG. 2d is a top view of the carriage of FIG. 2c, FIG. 2e is a face view of the unit shown in FIG. 2a including a carriage, FIG. 3a is a partly exploded sectional view of a roller-type carriage, FIG. 3b is a sectional view similar to FIG. 3a of a carriage mounted on a guide unit, FIG. 3c is a top view of the carriage shown in FIGS. 3/3b, FIG. 4a is a face view, partly exploded and sectional, of a ball-borne carriage, FIG. 4b is a top view of the carriage shown in FIG. 4a, FIG. 4c is a face view of a hollow section including a mounted carriage according to FIG. 4a, FIG. 4d is a cut top view of the unit shown in FIG. 4c, FIG. 5a is a (sectional) view of a roller-type carriage, FIG. 5b is a top view of the carriage of FIG. 5a, FIG. 5c is a face view of the carriage of FIGS. 5a/5b as mounted and incorporated into a hollow section, FIG. 5d is a face view of the hollow section guide unit of FIG. 5c, but shown per se, FIG. 6a is a face view of a three-cavity profile including outer sections with mounted roller-type carriages, FIG. 6b is a face view similar to FIG. 6a but with ball-borne carriages, FIG. 6c is a face view similar to FIG. 6a and FIG. 6b but with 2a roller-type carriage and 2a ball-borne one, FIG. 6d is a face view of the three-cavity profile of FIGS. 6a/6b/6c, but shown per se, FIG. 7 is a front elevation of a cross bed frame for a linear motion guide unit, FIG. 8a is a front view of a drive system for the linear motion guide unit of FIG. 7, FIG. 9 is an exploded sectional view of a roller shaft bearing corresponding to Line IX—IX in FIG. 8 and FIG. 10 is an exploded sectional view of a pinion shaft bearing corresponding to line X—X in FIG. 8.

In FIGS. 1a/1b/1c associated to one another, a linear motion guide unit 10 is shown which includes a support 12 with a rail body 14 that has a central crest 16 and two parallel outer edges 17, 18. A pair of shafts 20 having, at their peripheries, inclined tapped pocket holes 22 is attached to the support 12 by fixing screws or bolts 24. Between its outer edge 17 and crest 16, the rail body 14 comprises a round fillet 26 whose radius of curvature exactly equals that of a shaft 20. A more concave, recessed step 28 is provided between crest 16 and the other outer edge 18.

In FIG. 1b, support 12 is shown without shafts 20. It is designed as a section 31 having a base plate 32 with a plane bottom face 34 and vertical sunk bores or fixing holes 33. It is peculiar to section 31 that it includes a triplet group of further bores, viz. a slanted central hole 42 and an oppositely inclined pair of counter-holes 44 above and below or before and behind, respectively. All the holes 42, 44 are stepped so that the interior of rail body 14 comprises bore collars or shoulders 35 serving as stops for the heads 25 of bolts 24. As will be evident from FIGS. 2b and 2e, the axes of holes 42,44 and thus of bolts 24 are at an acute angle $\alpha$ to each other, preferably of about 45 degrees.

Linear motion guide unit 10 is mounted in such manner that at first, one shaft 20 (lefthand in FIGS. 1a and 1c) is fixed to fillet 26 of support 12 by means of bolt(s)

24 through inclined central hole(s) 42. Next, the other shaft 20 (righthand in FIGS. 1a and 1c) is placed on rail body 14 and is pulled onto it, with line locking to outer edge 18 and to the first shaft 20, by bolts 24 that extend through the oppositely inclined counter-hole pair 44 and that engage associated tapped pocket holes 22. This warrants accurate parallelism since the transversal components, in particular, of the bolting forces restrain the shafts 20 on rail body 14 in uniform line locking and with high rigidity.

It will also be seen that shaft extensions can be made by attaching first a through-shaft 20 (FIG. 1c) onto support section 31 whereupon ends of extension shafts meeting at a butt joint 47 are mounted by counter-bolting 24/44. This assembly is longitudinally stabilized by further supports 12 and/or sections 31 whereas transversally, the shafts 20 stabilize themselves by their strong parallel restraint (see FIG. 1a. Preferably, shafts 20 are of precision steel; supports 12 and/or sections 31 can be diecast aluminium components which are both light-weight and cheap.

Another linear motion guide unit 10 shown in FIGS. 2a and 2b includes a support 12 designed as a flat bar 30 having a rail body 14 of like contour as that of support section 31 (FIGS. 1a, 1b). Flat bar 30 holding the shafts 20 can also be an aluminium profile and be provided with bores 30 for face-side attachments and/or lead-through components. The plane bottom 34 includes slanted flutes 36 serving to facilitate boring the holes 42, 44 and, similar to shoulders 35 in the embodiment mentioned above, as stops for heads 25 of bolts 24 screwed in at hole groups 40. These are pairs of oppositely inclined bores which are arranged on either side of crest 16 at an acute angle α to each other. A cover ledge 46 closes the bottom of flat bar 30.

A carriage 49 (FIGS. 2c, 2d, 2e) rides on the rail structure via intermediate bearing means comprising lateral strings of balls 54 that engage the outer surfaces 21 (FIG. 1a) of the shaft pair 20. Countersunk fixing screws 53 and a chamfered steel plate Z safeguard the exact positioning of a lower string of balls 54 at the linear bearings 52 of carriage 49. If need be, different pretensioning can be achieved by choosing various degrees of fineness when machining the engaging faces. Ball-borne carriages 49 are capable of supporting heavy loads owing to the strings of balls 54 circulating, via reversing means (not shown), in a four-line engagement on the outer surfaces 21 of shaft pair 20. A support plate 50 of carriage 49 (FIG. 2d) comprises tapped holes 51 in order to be able to secure a device to be shifted. Longitudinal bores 59 (FIG. 2e) may serve to attach, for example, a stripping device or a lubricating nipple.

The carriage 49 of the embodiment of FIGS. 3a, 3b, 3c comprises rollers 55 whose shafts or axles 56 are rotatably supported in rolling bearings 57 and are held by mounting nuts 69 covered by plugs 58. A casing of carriage 49 includes as a stop a peripheral rib S (FIGS. 3a, 3b) to either side of which the rolling bearings 57 are secured free of play. Roller-type carriages of this sort are especially suited for fast motions since inadvertent misalignments cannot occur; although series-produced bearings 57 may be used, the generally hardened and ground or even polished rollers 55 warrant tight engagement as well as perfect support in their double bearing pairs. If desired, pretensioning can be effected by slightly narrowing the mutual distances of the rollers. Again, the support plate 50 of carriage 49 is provided with tapped holes 51 for receiving suitable load devices. A flat bar 30 of the type shown in FIG. 2a serves as a support 12.

It will be evident that ball-borne carriages as per FIGS. 2b to 2e are fully compatible and thus exchangeable with the roller-type carriages of the embodiment shown in FIGS. 3a to 3c. This feature is most useful in retrofitting, e.g. if the actual conditions require a change from heavy load operation to fast motion run or vice-versa.

Another carriage modification is depicted in FIGS. 4a to 4c. Again, linear ball bearings 52 are attached, by countersunk fixing screws 53 and chamfered washers Z, to the carriage 49 in such manner that ball strings 54 engage the outer surfaces 21 of shaft pair 20 (FIG. 4c). At its face, carriage 49 comprises a bolted flange 48 held by e.g. four bolts and provided with a slide member 60. The latter is adapted to zipper-like operate self-sealing lips 61 of a hollow section 64 (FIGS. 4c, 4d) having an inside rail structure with a shaft pair 20. Lips 61 consist preferably of polytetrafluoroethylene (tradename Teflon) and are retained in longitudinal recesses 65 of section 64 by snap-in ridges 63; they open and close opposing edges 62 as these are spread apart in front of a moving slide member 60 behind which they close again.

Sealing lips 61 protect, below a top face 67, the interior of hollow section 64 (FIGS. 4c and 5c) whose bottom 34 again comprises inclined flutes 36 and a cover ledge 46. As required for specific applications, longitudinal flutes 66 at the hollow section 64 may serve for attachment purposes.

In the embodiment of FIGS. 5a to 5d, carriage 49 is of the type having rollers 55 carried by mounting means 69. Slide member 60 includes a slotted block K (FIGS. 5a/5b) for receiving a synchronous belt 76 (FIG. 5c) to which it is fastened by hold-down screws 68. Slide member 60 operates self-sealing lips 61 mounted at the upper side of hollow section 64 which is shown for itself in FIG. 5d. It is seen that section 64 is integral, at its bottom, with rail body 14 designed as a flat bar 30 which includes a round fillet 26 separated by crest 16 from recessed step 28. Shaft pair 20 is secured in the way described above, i.e. a first shaft (lefthand in FIGS. 5c/5d) is mounted to matching fillet 26 whereupon the other shaft (righthand in FIGS. 5c/5d) is forced onto outer edge 18 of step 28 with line locking to the first shaft.

Basically the same structure as described above have the linear motion guide units 10 of FIGS. 6a to 6d showing three-cavity profiles 70 with a center cavity 71 which is integral with outer compartments or sections 64 adapted to receive supply lines, cables or other auxiliary means (not shown). The outer sections 64 encapsulate carriages 49 supported by rollers 55 and driven by a synchronous belt 76 (FIG. 6a); by linear ball bearings 52 and driven otherwise (FIG. 6b); or by one or the other in the embodiment of FIG. 6c where separate drive systems may be employed, e.g. selectively a spindle system (not shown) or a synchronous belt 76. The clear-cut box-like design of the three-cavity profile 70 with its center cavity 71 and outer hollow sections 64 will be evident from FIG. 6d.

An application featuring a cross bed frame 72 is illustrated in FIG. 7 where a horizontal guide bar 73 and a vertical guide bar 74 are combined with a common trolley 75. Using a first synchronous belt 76 that passes over guide rollers 78, horizontal guide bar 73 can be moved to and fro by a first motor 80. A second synchronous belt 79 passed over corresponding rollers 77, 78 takes care of an up-and-down motion under the drive of a second motor 81 having a pinion gear 82. Trolley 75 is distinguished by a crossing array of 4×2=8 rollers as seen in FIG. 8. Details of the structures mentioned and of a pinion bearing 83 used will be apparent from FIGS. 9 and 10. Caps 84 serve to close the bearings of the various rollers 55.

The modular design elucidated is particularly suitable for CNC plants (computerized numerical control systems), machines, axles, guide units for machining purposes and for light-weight to medium-weight handling in whatever industry, inclusive of clean-room technology.

The invention is not limited to the embodiments described. However, it will be realized that a preferred design of a linear motion guide unit 10 comprises two shafts 20 clamped together with positive line locking on a support 12 by bolts 24 engaging tapped pocket holes 22 inclined at an acute angle $\alpha$ relative to each other, one screw-hole 42 in the support 12 being inclined relative to a neighboring hole or to a mirror-symmetrical pair of counter-holes 44. Rail bodies 14 of aluminium integral with flat bars 30 include a fillet 26 with an adjacent crest 16 and a recessed step 28. Abutting ends 47 may be clamped, by bolting at a counter-hole pair 44, to a through-shaft 20 fixed at a central hole 42 on a single support 12 or 31. A continuous rail body 14 or 30 having spaced groups of screw-holes 40, 41 may be part of a box-like hollow section 64. In a three-cavity profile 70, two outer hollow sections 64 join a center cavity 71. A motor-driven carriage 49 includes either linear ball bearings 52 with strings of balls 54 or rollers 55 for engaging the outer surfaces of the shaft pair 20 and supports a slide member 60 for zipping operation of self-sealing lips 61 situated at an open hollow section side.

While preferred embodiments have been illustrated and explained hereinabove, it should be understood that numerous variations and modifications will be apparent to one skilled in the art without departing from the spirit of the invention which, therefore, is not to be construed as being limited to the specific forms described.

We claim:

1. Linear motion guide unit (10) having supports (12) for pairs of parallel clamped shafts (20) along which at least one member to be guided or a carriage (49) is supported thereon via linear ball bearings (52), rollers (55) which reach over the par of shafts (20) for moving engagement on their outer surfaces (21), respectively, wherein the shafts (20) are clamped together with positive line locking by bolting onto the support (12) and wherein bolts (24) extending through the support (12) are arranged at an angle relative to each other.

2. Linear motion guide unit according to claim 1, wherein each support (12) comprises a fillet (26) matching the shaft radius (r) and further comprises a recessed step (28) joining the fillet (26) along the longitudinal center of the support (12).

3. Linear motion guide unit according to claim 1, wherein the bolts (24) are at an acute angle ($\alpha$) to each other and engage tapped pocket holes (22) of the shafts (20).

4. Linear motion guide unit according to claim 1, wherein each support (12) is a mounting base (30) to be individually bolted, comprising a diecast aluminium body or profile having a base plate (32) and a rail body (14) integral therewith.

5. Linear motion guide profile according to claim 1, wherein each carriage (49) comprises a casing with an engaging portion with a peripheral rib (S) against which rolling bearings (57) are restrainable for supporting an axle (56) of a roller (55).

6. Linear motion guide unit according to claim 1, wherein two independent drive systems are provided for the carriage (49) at a cross bed frame (72) including a horizontal guide bar (73) and a vertical guide bar (74).

7. Linear motion guide unit according to claim 6, wherein the drive systems selectively comprise spindle drives or synchronous belt drives (76, 79) or combinations thereof.

8. Linear motion guide unit according to claim 1, wherein each support (12) includes a rail body (14) having a central crest (16) and, parallel thereto, two outer edges (17, 18) at transversal distances to the crest (16) which are smaller than the shaft diameter (d).

9. Linear motion guide unit according to claim 8, wherein at least some supports (12) include groups of closely neighboring screw holes (40, 41) which are slanted, extend through the respective support and are in mirror symmetry to the crest (16).

10. Linear motion guide unit according to claim 9, wherein each group (41) comprises three screw holes one (42) of which, arranged centrally in respect of a longitudinal direction, is inclined oppositely to a pair of counter-holes (44) lodged along the crest (16) in mirror symmetry to the central hole (42).

11. Linear motion guide unit according to claim 10, wherein for extension of a pair of shafts (20), two abutting shaft ends (47, FIG. 1c) are clamped against a through-shaft bolted to the central hole (42) and are bolted to the mounting base (30) at the pair of counter-holes (44).

12. Linear motion guide unit according to claim 9, wherein each screw hole (42, 44) includes at a bottom side a shoulder (35) for engagement of an associated bolt head (25).

13. Linear motion guide unit according to claim 9, wherein each group comprises a pair (40) of mutually inclined screw holes.

14. Linear motion guide unit according to claim 13, wherein each support (12) is an extended rail body (14) integral with a rail bar, with a flat bar (30) having a plane bottom face (34) and pairs of screw holes (40) arranged at regular distances.

15. Linear motion guide unit according to claim 14, wherein mutually inclined flutes (36) are provided in the bottom face (34).

16. Linear motion guide unit according to claim 14, wherein the rail bar is a component of a box-shaped hollow section (64).

17. Linear motion guide unit according to claim 12, wherein the hollow section (64) is a component of a multi-cavity profile (70) having a closed center cavity (71) and, on either side thereof, a hollow section (64) including an inner rail body (14, 30).

18. Linear motion guide unit according to claim 17, wherein supply lines, cables, driving elements, are housed in the center cavity (71).

19. Linear motion guide unit according to claim 16, wherein one side of the hollow section (64) is open and is provided with longitudinal recesses (65) for receiving sealing lips (61), at the side opposite to the rail body (14).

20. Linear motion guide unit according to claim 16, wherein each carriage (49) is provided with a slide member (60) for zipping operation of self-sealing lips (61).

* * * * *